Aug. 11, 1925.
H. W. PLEISTER
BOLT ANCHOR
Filed Feb. 1, 1924
1,549,326
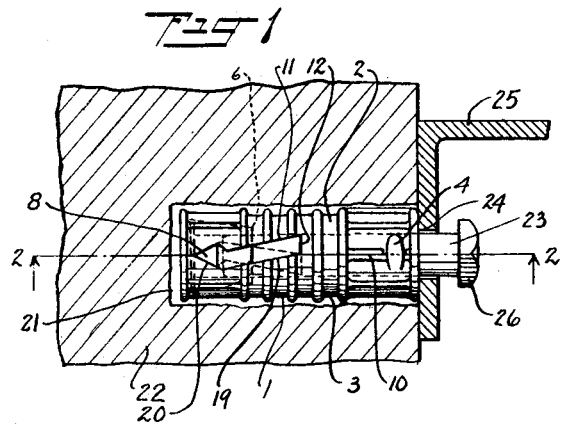
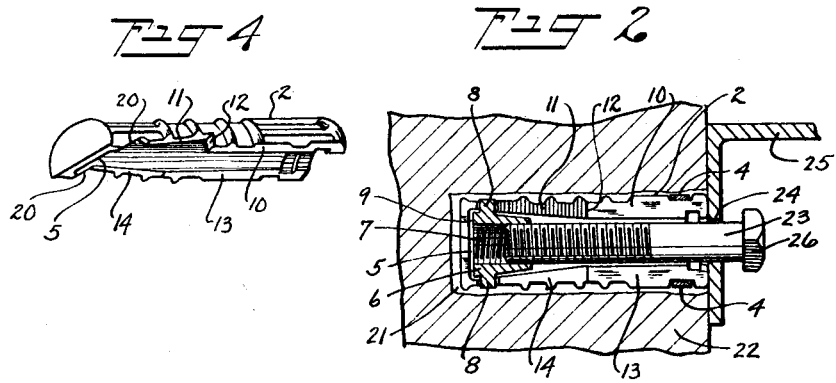
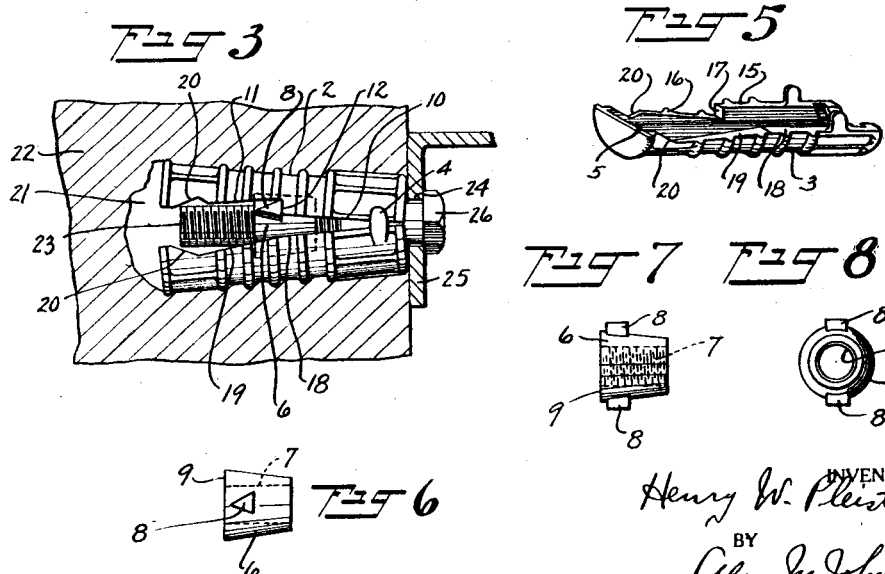
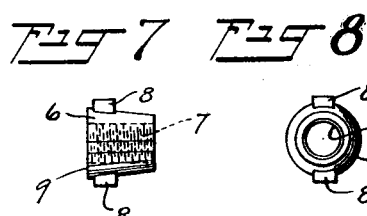
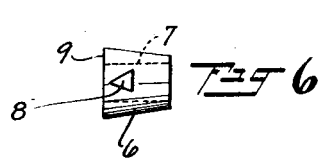

Patented Aug. 11, 1925.

1,549,326

UNITED STATES PATENT OFFICE.

HENRY W. PLEISTER, OF WESTFIELD, NEW JERSEY, ASSIGNOR TO HENRY B. NEWHALL.

BOLT ANCHOR.

Application filed February 1, 1924. Serial No. 689,934.

*To all whom it may concern:*

Be it known that I, HENRY W. PLEISTER, a citizen of the United States, residing at Westfield, in the county of Union and State of New Jersey, have made certain new and useful Improvements in Bolt Anchors, of which the following is a specification, taken in connection with the accompanying drawing.

My invention relates to bolt anchors and more particularly to the type of bolt anchor in which the shield is formed of a plurality of parts, which are expanded by an expanding member, as for example a nut, being drawn or forced between the parts of the shield by rotating a bolt, or other similar member. This general type of bolt anchors is known in the trade as machine type expansions.

In this type the screw-threaded expanding nut has projecting lugs extending between the meeting edges of the two parts of the shield, to guide the nut in its longitudinal travel and prevent its free rotation, when the machine bolt, or similar member, is screwed within it.

It will more fully hereinafter appear, under certain circumstances that this type of machine expansion has proved unsuccessful in use, in that when imbedded in certain relatively soft or yielding material, and put under excessive strains or stresses, the machine or other bolt, and the nut will be pulled entirely through and out of the shield, permitting the work to drop; or, pulled partially out of the shield, in which case the work will become dangerously loosened in the wall, floor or other support.

I believe myself to be the inventor of the broad invention of a machine expansion formed of a plurality of parts having meeting edges which cannot be pulled out of the hole in which it is seated, without pulling, not only the bolt and nut, but also the entire shield from the hole. This makes my machine type expansion a perfect one because in practice no strains or stresses are ever placed upon such an expansion which would pull the entire expansion from the hole; though a much less strain or stress will, under certain conditions, pull the nut and bolt through and entirely out of the shield of the old form of machine type expansion, as previously pointed out.

My invention covers such an expansion broadly. My invention further relates to certain combinations, details of construction, and articles of manufacture which will be more fully hereinafter described and pointed out in the claims.

In the accompanying drawings the same reference numerals refer to similar parts in the several figures.

Fig. 1 is a vertical section through a wall or other suitable support, and the work supported, showing my improved expansion in side elevation;

Fig. 2 is a horizontal section, substantially on the line 2—2 of Fig. 1, looking in the direction of the arrows;

Fig. 3 is a vertical section of the support and side elevation of my expansion, similar to Fig. 1, but showing the parts in their expanded position;

Fig. 4 is a detail perspective view of one half of the shield;

Fig. 5 is a detail perspective view of the other half of the shield;

Fig. 6 is a side elevation of the expanding nut;

Fig. 7 is a plan view of the nut;

Fig. 8 is an end elevation of the nut.

When the machine type of expansions now on the market are mounted in certain more or less yielding material, such as a poor grade of concrete, cinder concrete, asbestos cement, and similar more or less yielding material, after the bolt has forced the nut far enough to create a maximum expansion, and if additional strain or stress is placed upon the nut, either by further screwing the bolt, or by any excessive strain upon the work supported by the bolt, the more or less yielding material will permit the parts of the shield, in many instances, to still further slightly expand, and this will allow the nut, with its bolt, to be entirely pulled out of the shield, or partially pulled out as the case may be.

If this additional strain or expanding action is sufficient to simply cause the nut and bolt to be partially withdrawn from the shield, the fastening is dangerously weakened and will permit the work, whatever it may be, to be more or less loosely held to the support. If this excessive strain is sufficient to pull the bolt, with its nut, entirely out of the shield, the work will then fall with possible serious consequences to workmen or property. Of course, when the bolt and nut are withdrawn from the shield, the shield members may still remain in the hole, either expanded or collapsed, but they no longer perform any useful function.

By my invention, I insure that this pulling of the nut and bolt from the shield can never take place, because after the parts have reached their maximum expanded position they are locked, and it is impossible to withdraw the bolt and nut from the shield without pulling the shield, at the same time, from the hole. In practice, no strains are ever thrown upon an expansion which would be sufficient to pull out the entire expansion, including the shield members, though in certain yielding materials, as previously pointed out, the bolt and nut have been withdrawn from the shield, thereby rendering the expansion inoperative and of no value.

Various forms of devices may be used to accomplish this result. In the drawings I have shown one form, but it is of course to be understood that this is merely illustrative and that my invention is not to be confined to it.

My machine expansion 1 comprises the shield members 2 and 3, the latter members having the usual bendable lugs 4, 4 to secure the two halves of the shield together. Mounted in the inner end 5 of each of the shield members is a conical nut 6, having interior screw threads 7 and exterior lugs 8, 8. In this form of my inventino, the base 9 of the conical nut is circular and fits within the circular seat 5 formed in the ends of the shield members 2 and 3. The meeting edge 10 of the shield member 2 is provided with an inclined surface 11, ending in an abrupt shoulder or stop 12. The other meeting edge 13 of the same shield member is provided with an inclined surface 14.

The other shield member 3, on its parting edge 15, is provided with an inclined surface 16, similar to the inclined surface 11, which ends in an abrupt shoulder or stop 17. The other meeting edge 18 of the member 3 has an inclined surface 19. When these members are placed together as shown in Figs. 1 and 3, the lugs 8, 8 upon the cone nut 9 rest normally, in their inoperative positions, within the seats 20, 20, formed on the two shield members 2 and 3; this being their shipping position.

After the hole 21 has been drilled, or otherwise formed within the support 22, and the expansion 1 located therein, the machine or other bolt 23 is passed through the hole 24 in the work 25 and thence through the expansion until it engages with the female screw-threads 7 in the conical nut 6. By rotating the head 26 of the machine bolt the cone nut 6 tends to rotate within its circular housing 5 due to the friction of the screw-threads 7 in the nut and the screw-threads on the bolt 23. This rotation is resisted by the lugs 8, 8 engaging with the meeting edges of the two sections 2 and 3 of the shield, so that the nut is caused to move inward towards the work 25. After the nut 6 is moved from the very end of the shield members 2 and 3, the lugs 8, 8 will engage with the inclined surface 11 on the shield member 2, and the corresponding inclined surface 16 upon the member 3. This is due to the fact that while the nut can not rotate freely within the shield members it has a tendency to rotate due to the drag or friction of the screw-threads upon the bolt cooperating with those in the nut. In Figs. 1 and 3 of the drawing, this tendency to rotate is clock-wise, and will carry the lugs 8, 8 along in contact with the respective inclined surfaces 11 and 16 until the point of maximum expansion has been reached, when the lugs 8, 8 will be brought up sharp against the abrupt shoulders or stops 12 and 17 on opposite sides of the expansion 1.

In this position, the parts are locked and it is impossible to move the conical nut 6 further along the longitudinal axis of the shield members. It will, therefore, be apparent that any further rotation of the head 26 of the bolt cannot further spread or expand the shield members 2 and 3; it will also be clear that it will be impossible to withdraw the bolt 23 and nut 6 from the shield members 2 and 3. My expansion will not permit the work 25 to become loosened, or to fall, because the shield members 2 and 3, the nut 6 and the bolt 23 are all locked together as one unitary structure. It will, therefore, be impossible to accidentally remove them from the hole 21, without pulling out not only the bolt 23 and nut 6, but also both the shield members 2 and 3. In practice no such excessive strains are ever placed upon such expansions. It will be clear, therefore, that when once my bolt anchor is located it permanently secures the work even when the expansion is mounted in a poor grade of concrete, cinder concrete, asbestos cement, or any other similar more or less yielding material.

It will be further noted that by permitting the nut 6 to have a slight rotary or spiral motion in its travel towards the stops 12 and 17 there is a secondary advantage in that it tends to prevent the nut from binding when subjected to the enormous compression strains of the shield against the wall of the hole 21. This slight spiral motion of the nut is of some advantage for the surface of the nut and the interior of the shield are usually unmachined, sand finished, ordinary clean castings between the surfaces of which considerable friction would develop under the expansive strains; this is somewhat lessened by the slightly spiral or wormlike movement of the nut 6, in a clockwise direction, as the lugs 8, 8 seek their stops 12 and 17.

Having thus described this invention in connection with an illustrative embodiment thereof, to the details of which I do not desire to be limited, what is claimed as new and what is desired to be secured by Letters Patent is set forth in the appended claims.

What I claim is:—

1. In an expansion bolt, a shield formed of a plurality of parts having meeting edges, a movable expanding member mounted in the shield and having members cooperating with the meeting edges of the shield, and means to limit the movement of the expanding member.

2. In a machine type expansion, the combination of a shield formed of a plurality of parts having meeting edges, an expanding cone having lugs to cooperate with the meeting edges of the shield sections, and means to limit the movement of the cone.

3. In a machine type expansion, the combination of a shield formed of a plurality of parts having meeting edges, an expanding cone having lugs to cooperate with the meeting edges of the shield sections, and stops to limit the movement of the cone.

4. In a machine type expansion, the combination of a shield formed of a plurality of parts, a circular cone nut adapted to have a limited rotary movement in the shield, and cooperating members carried by the shield and by the nut to limit the movement of the nut.

5. In a machine type expansion, the combination of a shield formed of a plurality of parts, a circular cone nut adapted to have a limited rotary movement in the shield, and stops carried by the shield and by the nut adapted to be brought into operation by the slight rotary and longitudinal movement of the cone nut.

6. In a machine type expansion, the combination of a shield formed of a plurality of parts and provided with cooperating inclined grooves forming inclined slots crossing the medial line of the shield, a cone nut provided with lugs to cooperate with, and be guided by, the inclined slots, and stops carried by the shield to engage with the lugs carried by the cone nut and limit the longitudinal movement of said nut.

7. In an expansion bolt, a shield formed of a plurality of parts having meeting edges provided with inclined expanding surfaces and stops, a movable expanding member mounted in the shield and having members cooperating with the inclined expanding surfaces on the meeting edges of the parts of the shield to expand the shield and to engage with the stop when the desired maximum expansion of the shield has been obtained.

8. In an expansion bolt, a shield formed of a plurality of parts having meeting edges provided with inclined expanding surfaces and stops, a movable expanding member mounted in the shield and having members cooperating with the inclined expanding surfaces on the meeting edges of the parts of the shield to expand the shield and to engage with the stops when the desired maximum expansion of the shield has been obtained.

9. In an expansion bolt, a shield formed of a plurality of parts having meeting edges provided with inclined expanding surfaces ending in abrupt shoulders, a movable expanding member mounted in the shield and having members cooperating with the inclined expanding surfaces on the meeting edges of the parts of the shield to expand the shield and to engage with the abrupt shoulders when the desired maximum expansion of the shield has been obtained.

HENRY W. PLEISTER.

Witnesses:
MARY R. RYAN,
A. M. WILLIAMS.